(12) United States Patent
Saman

(10) Patent No.: US 12,194,520 B2
(45) Date of Patent: Jan. 14, 2025

(54) HEATING SYSTEM FOR PRODUCTION OF A DOUBLE-LAYER TUBE

(71) Applicant: NET BORU SANAYI VE DIS TICARET KOLLEKTIF SIRKETI BORA SAMAN VE ORTAGI, Istanbul (TR)

(72) Inventor: Bora Saman, Istanbul (TR)

(73) Assignee: NET BORU SANAYI VE DIS TICARET KOLLEKTIF SIRKETI BORA SAMAN VE ORTAGI, Istanbul (TR)

( * ) Notice: Subject to any disclaimer, the term of this patent is extended or adjusted under 35 U.S.C. 154(b) by 633 days.

(21) Appl. No.: 17/312,622

(22) PCT Filed: Dec. 10, 2018

(86) PCT No.: PCT/TR2018/050783
§ 371 (c)(1),
(2) Date: Jun. 10, 2021

(87) PCT Pub. No.: WO2020/122820
PCT Pub. Date: Jun. 18, 2020

(65) Prior Publication Data
US 2022/0072595 A1    Mar. 10, 2022

(51) Int. Cl.
*B21C 37/08* (2006.01)
*B21C 37/06* (2006.01)
*G05D 23/19* (2006.01)

(52) U.S. Cl.
CPC ......... *B21C 37/06* (2013.01); *G05D 23/1928* (2013.01)

(58) Field of Classification Search
CPC ......... B21C 37/06; B21C 37/08; B21C 37/14; G05D 23/1928
See application file for complete search history.

(56) References Cited

U.S. PATENT DOCUMENTS

| | | | | |
|---|---|---|---|---|
| 2,373,116 | A * | 4/1945 | Hobrock | B21C 37/09 219/85.17 |
| 5,297,587 | A * | 3/1994 | Johnson | B23K 35/38 138/DIG. 6 |
| 5,447,179 | A * | 9/1995 | Gibbs | B23K 1/19 138/143 |
| 10,221,989 | B2 * | 3/2019 | Ramirez | B23K 1/0004 |

FOREIGN PATENT DOCUMENTS

| | | | |
|---|---|---|---|
| CN | 101004599 A | 7/2007 | |
| CN | 104582018 A * | 4/2015 | ........ A47J 27/21016 |
| DE | 102010024034 A1 * | 7/2011 | ............ B21C 37/08 |

(Continued)

OTHER PUBLICATIONS

PCT/TR2018/050783, "International Search Report and Written Opinion", Dec. 3, 2019, 8 pages.

*Primary Examiner* — Gregory A Wilson
(74) *Attorney, Agent, or Firm* — Bayramoglu Law Offices LLC

(57) ABSTRACT

A heating system for use in the manufacture of copper coated double-layer steel tubes having a casing in which the roll-wrapped tube is heated to a predefined temperature value. The heating system comprises a sensor configured in an outer portion of the casing such that the sensor is able to determine a temperature value within the casing.

11 Claims, 3 Drawing Sheets

(56) References Cited

FOREIGN PATENT DOCUMENTS

| | | | | |
|---|---|---|---|---|
| ES | 2756498 T3 * | 4/2020 | ......... | B21C 37/0807 |
| TR | 201000280 T2 | 5/2011 | | |
| WO | 2008016309 A1 | 2/2008 | | |
| WO | WO-2009035425 A1 * | 3/2009 | ............. | B21C 37/09 |
| WO | WO-2014086487 A1 * | 6/2014 | ............... | A21B 1/40 |

* cited by examiner

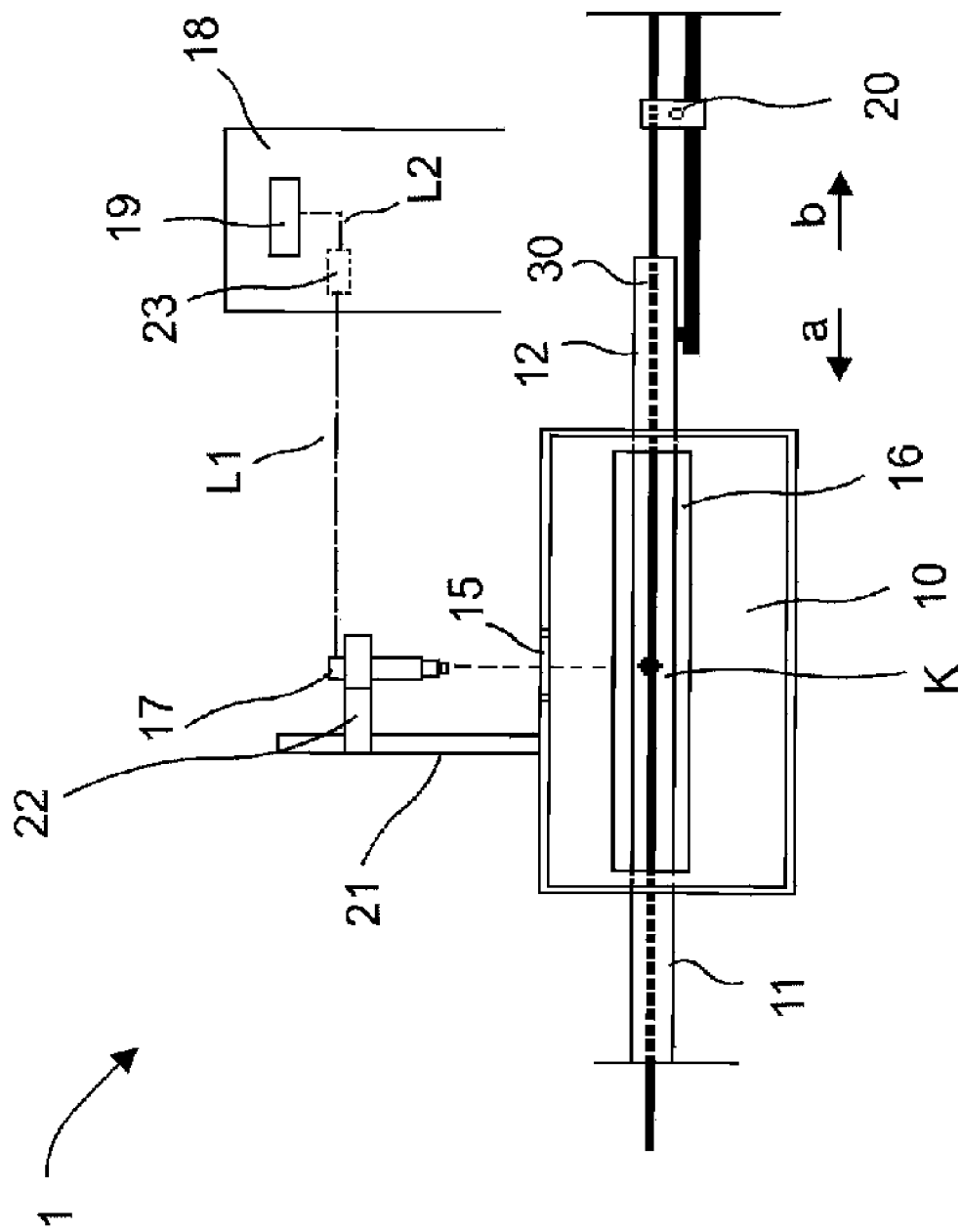

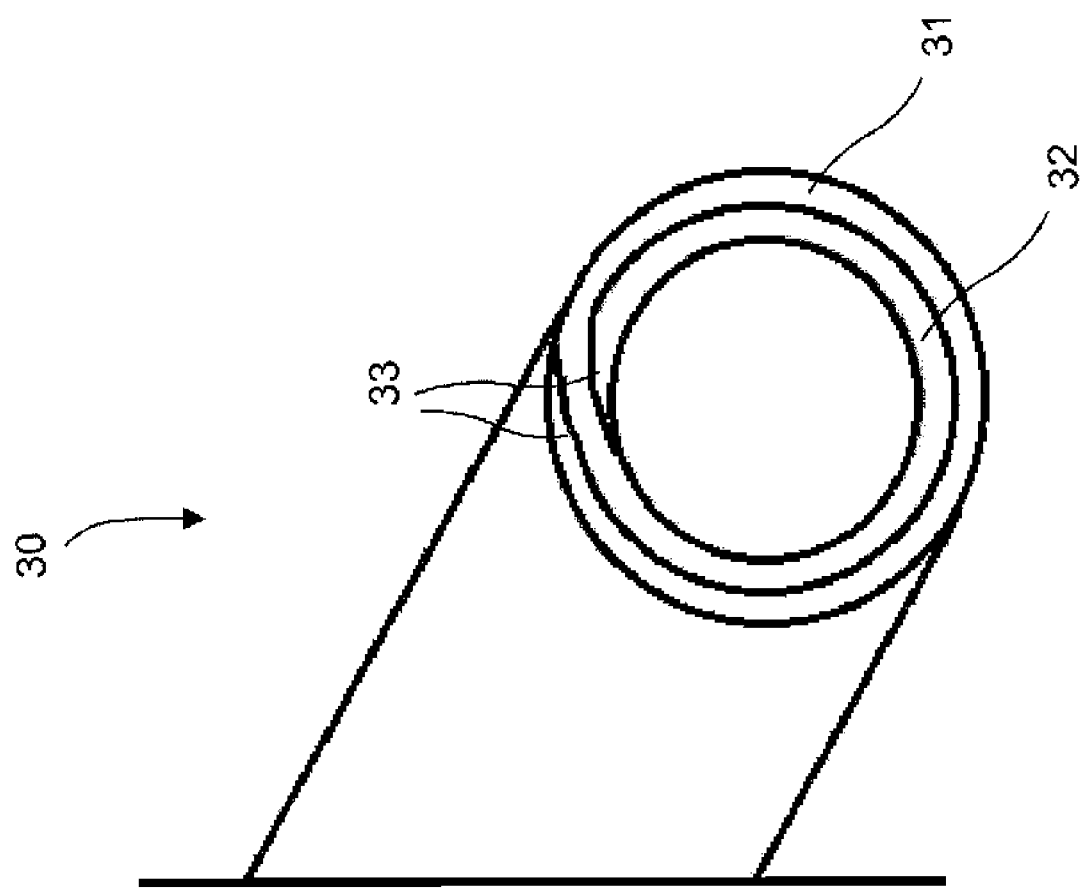

HEATING SYSTEM FOR PRODUCTION OF A DOUBLE-LAYER TUBE

RELATED APPLICATIONS

This application is a U.S. National Phase of International Application No. PCT/TR2018/050783, filed Dec. 10, 2018, the entire disclosure of which is incorporated by reference herein.

TECHNICAL FIELD

The invention relates to a heating system for producing double-layer and copper-coated steel tubes, in which the tube layers are joined together.

PRIOR ART

Currently, walls of a steel sheet layer to be used in the welding process is coated with a copper material. Copper-coated steel sheets are rolled in a tube forming unit and to obtain a cold double tube form. The double layer tubes with copper layer are heated to a temperature above the melting temperature of the copper in a furnace.

In the furnace, the tube moves at a predetermined feed rate are joined under a protective gas.

The hot tubes from the joining process, at the end of an annealing unit cool down to obtain seamless double-layer tube.

TR201000280 discloses a copper coating method using electrolysis on the sheet steel layer to obtain a two-layer tube from the obtained copper coated plate, by reaching a welding temperature of the two-layer tube, heating at the welding temperature, and double-layer tube production process by welding with the heated copper at optimum welding conditions.

BRIEF DESCRIPTION OF THE INVENTION

The object of the invention is to control joining temperature in a heating system where the layers of the tube are welded for the production of double-layered tubes.

Another object of the invention is to control the melting temperature of the copper layer in the double-layer steel tube in the heating system.

In order to achieve the aforementioned object, the invention is a heating system for manufacture of copper coated double-layer steel tubes having a casing in which the roll-wrapped tube forms are heated to a predefined temperature value. The heating system comprises a sensor configured in an outer portion of the casing such that the sensor is able to determine temperature value inside the casing. Thus, it is ensured that the temperature value in the casing is sensed from the outer part of the casing. In this way, during the production of double-layer tubes, the temperature of the joining in the heating system is controlled. Here, the term "joining" refers to the "welding" process. Here, it is a "welding temperature", which is meant by the "temperature of the joining". Joining temperature in a double-layer steel tube is the melting temperature of the copper layer.

In a preferred embodiment, the sensor is being positioned such that facing towards a joining point of the tube forms in the casing. Thus, the temperature control is provided by a joining point of the tube. By the joining point, it is meant that a point where the steel layer and copper layer meet with the welding process in double-layer tube in the casing.

In another preferred embodiment, there is a first window arranged on the casing, corresponding to the sensor. Thus, a see through opening inside the casing is provided for the sensor.

In another preferred embodiment, the first window is configured on an upper wall of the casing. Thus, the sensor is provided to observe the inside of the casing from the upper wall.

In another preferred embodiment, a bar is extending away from the casing. Thus, it is ensured that the sensor is positioned at a location away from the casing, therefore the sensor is not affected by the high temperature.

In another preferred embodiment, a retaining element is disposed on the bar, which at least partially surrounds the sensor. Thus, it is ensured that the sensor is secured at least partially by winding.

In another preferred embodiment, the casing has a second window from which an interior is seen. Thus, it provides a second window in which an operator can easily see the enclosure. In this way, the operator can visually control the joining process of the tube.

In another preferred embodiment, the casing comprises an inlet into which the tube form of the roll is fed to the heating system. In this way, an inlet is provided from which the tube enter the casing.

In another preferred embodiment, the casing comprises an outlet of copper-coated double-layered steel tubes from the heating system. In this way, the outlet of the copper-plated double-layer steel tubes can be removed from the casing.

In another preferred embodiment, a handle is provided allowing adjustment of the temperature value within the casing. Thus, a handle is provided in which the operator can adjust the temperature inside the casing.

In another preferred embodiment, there is a control element is configured to measure the temperature value provided by the sensor. Thus, a control element receive the temperature information provided by the sensor.

In another preferred embodiment, there is a display configured to indicate the temperature value provided by the control element. Thus, a display is provided for the operator to visually identify the temperature value inside the casing.

In another preferred embodiment, the sensor is a temperature sensor that measure the temperature value from a predefined distance.

BRIEF DESCRIPTION OF THE FIGURES

FIG. 2 shows a representative front view showing the heating system according to the invention.

FIG. 3 shows a representative view of the double-layer tube obtained after joining in the heating system according to the invention.

DETAILED DESCRIPTION OF THE INVENTION

Figure 1:
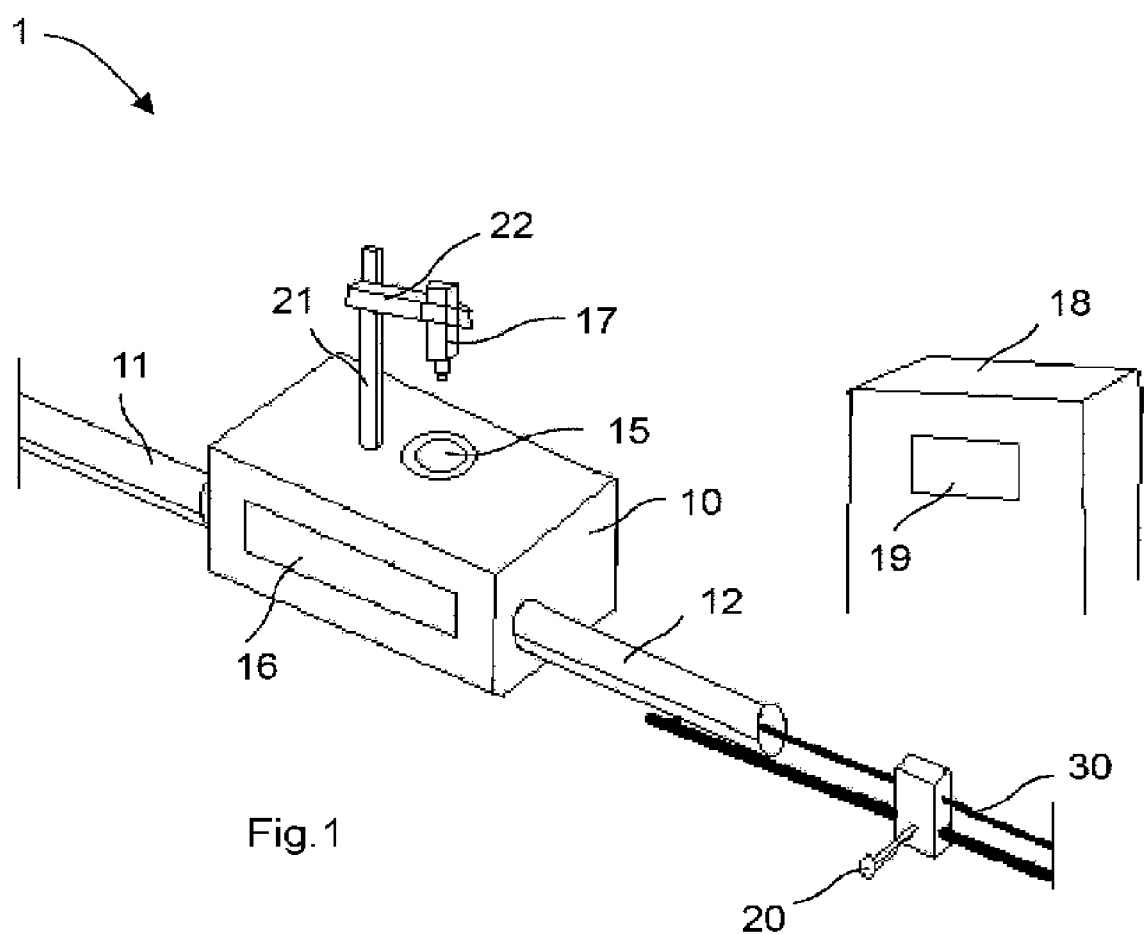
FIG. 1 shows a representative perspective view showing the heating system according to the invention.

FIG. 1 shows a representative perspective view showing a heating system (1) according to the invention. The heating system (1) comprises in its most common form a casing (10) and a control unit (18). A display (19) is provided on the control unit (18) which provides the user with visual data. A first window (15) is provided on an upper wall (13) of the casing (10). In a possible embodiment, the first window (15) is provided in a circular form. A second window (16) is described on the front wall (14) of the casing (10) which is accessible from the front side of the user's heating system (1). In a possible embodiment, the second window (16) is provided such that the front wall (14) is in a horizontal direction. The first window (15) and the second window (16) are covered by a transparent material in the structure showing the interior of the casing (10). In a possible embodiment, said transparent material is a glass. The side faces of the casing (10) which are mutually opposite each other have an inlet (11) and an outlet (12). A hollow tube extends from the inlet (11) of the casing (10) to the outlet (12). The tube has a circular cross-section. The tube forms, which are wound into a roll into the casing (10) from the inlet (11), emerge as a double-layer tube (30) from the outlet (12). In more detail, the roll-shaped tube emerge as a double-layer tube (30). A representative view of the double-layer tube (30) coming out of the heating system (1) is shown in FIG. 3. In a possible embodiment, said double-layer tube (30) is a copper-coated steel tube. The copper-coated steel tube has a steel layer (31), a copper layer (32) and a joining section (33) with a steel layer (31) and a copper layer (32). Said joining section (33) is the portion of the double-layer tube (30) welded.

In the heating system (1), there is a bar (21) provided with the casing (10) in the upper wall (13) with the first window (15). A retaining element (22) is positioned on one side of said bar (21) away from the upper wall (13).

The retaining element (22) secures a sensor (17). In more detail, the retaining element (22) is configured to at least partially surround the sensor (17). In this way, the sensor (17) is located in an outer portion of the casing (10).

Referring to FIG. 2, the sensor (17) is positioned to correspond to the first window (15). In this way, the sensor (17) is positioned in such a way that a joining point (K) of the tube in the casing (10) is visible. Said joining point (K) is the point at which the copper layer (32) and the steel layer (31) are joined to the welding process. This is achieved by melting copper. The sensor (17) positioned to display the joining point (K) is a temperature sensor that senses the temperature value from a distance. The sensor (17) is connected to a control element (23) in the control unit (18) with a first line (L1). The temperature value sensed by the sensor (17) is transmitted to the control element (23) by the first line (L1). The temperature value received by the control element (23) is transmitted to the display (19) by a second line (L2). In a possible embodiment, said control element (23) is a printed circuit board.

In the heating system (1), the casing (10) has a adjustment mechanism in which the temperature value is adjusted. There is a handle (20) in the adjustment mechanism. The temperature value in the casing (10) increases as the user enables the adjustment mechanism to move in a first direction (a) by means of the handle (20). Again, the temperature value in the casing (10) decreases with the user enabling the adjustment mechanism to move in a second direction (b) via the handle (20). In this way, the user adjusts the temperature value in the casing (10) by means of the handle (20) and can visually see the temperature value sensed by the sensor (17) on the display (19). In a possible embodiment, said temperature value is in the range of a minimum of 100° C. and a maximum of 1200° C. In a possible embodiment, the sensed temperature is a melting temperature of the copper.

REFERENCE NUMBERS

1. Heating system
10. Casing
11. Inlet
12. Outlet
13. Upper wall
14. Front wall
15. First window
16. Second window
17. Sensor
18. Control unit
19. Display
20. Handle
21. Bar
22. Retaining element
23. Control element
30. Double-layer tube
31. Steel layer
32. Copper layer
33. Joining section
a. First direction
b. Second direction
K. Joining point
L1. First line
L2. Second line

The invention claimed is:

1. A heating system for manufacture of copper coated double-layer steel tubes comprising:
   a casing comprising a furnace configured to heat a roll-wrapped tube inside of said casing to a predefined temperature value at which at least one layer of the roll-wrapped tube is melted to weld a plurality of layers of the roll-wrapped tube; and
   a sensor disposed outside of the casing such that the sensor is configured to sense a temperature inside the casing,
   wherein a first window is arranged on the casing corresponding to the sensor such that a joining point of the tube is visible to the sensor through the window.

2. The heating system according to claim 1, wherein the first window is arranged on an upper wall of the casing.

3. The heating system according to claim 1, wherein a bar is extending away from the casing.

4. The heating system according to claim 3, wherein a retaining element is disposed on the bar and which at least partially surrounds the sensor.

5. The heating system according to claim 1, wherein the casing has a second window from which an interior of the casing is seen.

6. The heating system according to claim 1, wherein the casing comprises an inlet into which the tube form of the roll is fed to the heating system.

7. A heating device according to claim 1, wherein the casing comprising an outlet from which the copper coated double-layer steel tube exit from the heating system.

8. The heating system according to claim 1, wherein a handle is provided allowing adjustment of the temperature inside the casing.

9. The heating system according to claim 1, wherein a control element is configured to measure the temperature provided by the sensor.

10. The heating system according to claim 9, wherein a display configured to indicate a temperature value provided by the control element.

11. The heating system according to claim 1, wherein the sensor is a temperature sensor configured to measure the temperature inside the casing from a predefined a distance.

* * * * *